(12) United States Patent
Buisson

(10) Patent No.: US 6,575,683 B2
(45) Date of Patent: Jun. 10, 2003

(54) CONTAINER SEAMING DRIVING CAM WITH LOAD CELLS

(75) Inventor: Raymond Buisson, Senlis (FR)

(73) Assignee: Centre Technique des Industries, Mecaniques, Senlis (FR)

(*) Notice: Subject to any disclaimer, the term of this patent is extended or adjusted under 35 U.S.C. 154(b) by 177 days.

(21) Appl. No.: 09/734,133

(22) Filed: Dec. 11, 2000

(65) Prior Publication Data

US 2001/0048864 A1 Dec. 6, 2001

(30) Foreign Application Priority Data

Dec. 13, 1999 (FR) ............................................. 99 15684

(51) Int. Cl.[7] .......................... B21D 51/32; B21B 37/03
(52) U.S. Cl. .............................. 413/26; 72/19; 72/21.4; 72/31.04; 413/20; 413/30
(58) Field of Search ............................... 72/21.4, 31.04, 72/19; 73/862.541, 862.623, 862.628; 413/26, 27, 28, 29, 30

(56) References Cited

U.S. PATENT DOCUMENTS

| | | | |
|---|---|---|---|
| 3,222,921 A | * 12/1965 | Schreiber et al. | ............. 413/20 |
| 4,022,141 A | * 5/1977 | Bartenstein | ................ 413/30 |
| 4,205,617 A | 6/1980 | Chmielowiec | ............... 413/27 |
| 4,606,205 A | * 8/1986 | Segredo et al. | ................ 72/19 |

FOREIGN PATENT DOCUMENTS

| | | |
|---|---|---|
| EP | 0 181 234 A2 | 5/1986 |
| WO | WO 98/07534 | 2/1998 |

* cited by examiner

Primary Examiner—W. Donald Bray
(74) Attorney, Agent, or Firm—Hoffmann & Baron, LLP

(57) ABSTRACT

A driving cam for seaming a container includes a cam base, an annulus, a bar, and first and second load cells. The annulus is defined by an internal profile and an external profile and is formed with an active sector. The active sector has a first end and a second end and is defined by the internal profile and the external profile. The external profile for defining the active sector is formed with an ascending ramp at the first end and a descending ramp at the second end with a plateau located between the ascending ramp and the descending ramp. The internal profile for defining the active sector is formed with a first recess at the first end and a second recess at the second end with a flat inner face located between the first recess and the second recess. The bar is connected to the cam base and is located within the annulus below the active sector. The load cells are connected between the bar and the flat inner face adjacent to the recesses. The load cells are configured to generate electrical output signals for processing by an analytical device that represent a force exerted by the annulus on the drive follower.

5 Claims, 3 Drawing Sheets

CONTAINER SEAMING DRIVING CAM WITH LOAD CELLS

BACKGROUND OF THE INVENTION

1. Field of the Invention

The present invention relates to the seaming of containers such as cans of foodstuffs or the like by means of a seaming machine in which the application of the seaming tool (usually a wheel) on the lip to be seamed is controlled by the rolling of a follower against a cam formed by an annulus, formed on an active sector of which is an external profile comprising an ascending ramp and a descending ramp.

2. Description of the Prior Art

The production and/or use of cans of foodstuffs necessitates one or two operations of seaming of the can ends. The tightness of a closed can depends on how tight the seams are on the inside.

In two-pass seaming machines, this tightness is closely related to the force applied to the metal sheets forming the can and the can end during the second pass. There are two methods of monitoring the quality of the seaming by real-time measurement of the force applied by the cam to the follower actuating the seaming wheel.

The first method, illustrated in document U.S. Pat. No. 4,205,617 A, utilizes force sensors, which seem to be load cells, incorporated in the cam, which has a solid active zone, and connected to an appropriate signal processing circuit, but there is no description given of how they are incorporated, and there are reasons for thinking that the way the sensors are implanted greatly influences the results of the measurements and their reliability.

The second method is used by a commercially available two-pass seaming driving cam, in which the cam corresponding to the second pass comprises in the active sector, internally, a profile defined by two deep symmetrical recesses with rounded corners, containing not load cells but deformation gauges, whose electrical output signals are processed by an analytical device to produce a signal representing the force exerted by the cam on the follower, in practice a signal proportional to this force. Such an arrangement is also shown in documents WO 98/07 534 and EP 0 181 234. To the best of the Applicant's knowledge, these two recesses are machined in the thickness of the cam, on the opposite side from the active profile, their form being defined only as a function of the constraints of the installation of the gauges.

Research carried out by the Applicant has shown that this arrangement is not entirely satisfactory in the sense that the electrical signal obtained does not faithfully represent the force applied by the cam in bringing about the seaming. Although, as expected, a sensitive part does exist in the active zone of the profile, it is found that when a constant force travels from one end of the sensitive part to the other, the response of the sensor is not constant, which is undesirable. The response is at its greatest when the force is in the middle and at its lowest when the force is at either end. The ratio of non-uniformity may be as much as 50% or more—which means that when the force is in the middle, the response of the system may be more than twice what it is when the force is at either end.

SUMMARY OF THE INVENTION

The object of the invention is to provide a solution to the faults of the two methods and to provide a cam, or a modification of an existing cam, that has a better response all the way along the length of the sensitive part.

The object of the invention is achieved with a seaming driving cam formed by an annulus, formed on an active sector of which are, on the one hand, an external profile comprising an ascending ramp and a descending ramp and, on the other hand, an internal profile defining a plateau zone between two deep recesses, sensors being arranged so that their electrical output signals are processed by an analytical device to produce a signal representing the force exerted by the cam on a drive follower that rolls on it, the cam being characterized in that the sensors are load cells arranged between the plateau zone and an adjustable bearing part that sits in front of it and that is fixed to an inactive part of the cam. The thickness of the bridges of material left by the deep recesses is such that their stiffness is negligible compared with the stiffness of the sensors. The rigid bearing part provides an alternative active zone of low deformability comparable with the virtually nondeformable solid active zone of the first method, in contrast to the conventional active zone with an internal plateau profile as in the second method. In one particular embodiment of the invention, it has been possible to define the different components so that the extra deflection under the seaming force of the cam profile in its active part compared with the deflection of the solid cam of the first method is not more than two hundredths of a millimetre. The load cells are advantageously quartz discs and are prestressed; their very high coefficient of stiffness (several hundreds of millions of daN per meter) is compatible with the minimum deflection defined above.

The cam according to the invention can easily be produced by modifying an existing cam, especially if it already includes a plateau zone. Tapped holes are machined in the base of the cam to enable the sensor bearing part to be mounted using screws, advantageously combined with a system of adjustment by means of eccentrics.

This adjustment system both enables the sensors to be prestressed and allows the cam profile to be slightly predeformed in the opposite direction to the deformation that will occur as the follower passes over it. Besides reducing the effects of the deformation of the system under load, this operation eliminates the microshocks of contact between the parts during operation and thus eliminates wear due to friction ("fretting corrosion").

Other characteristics and advantages of the present invention will be found in the following description of an example of an embodiment of the invention illustrated in the accompanying drawings.

Figure 1:
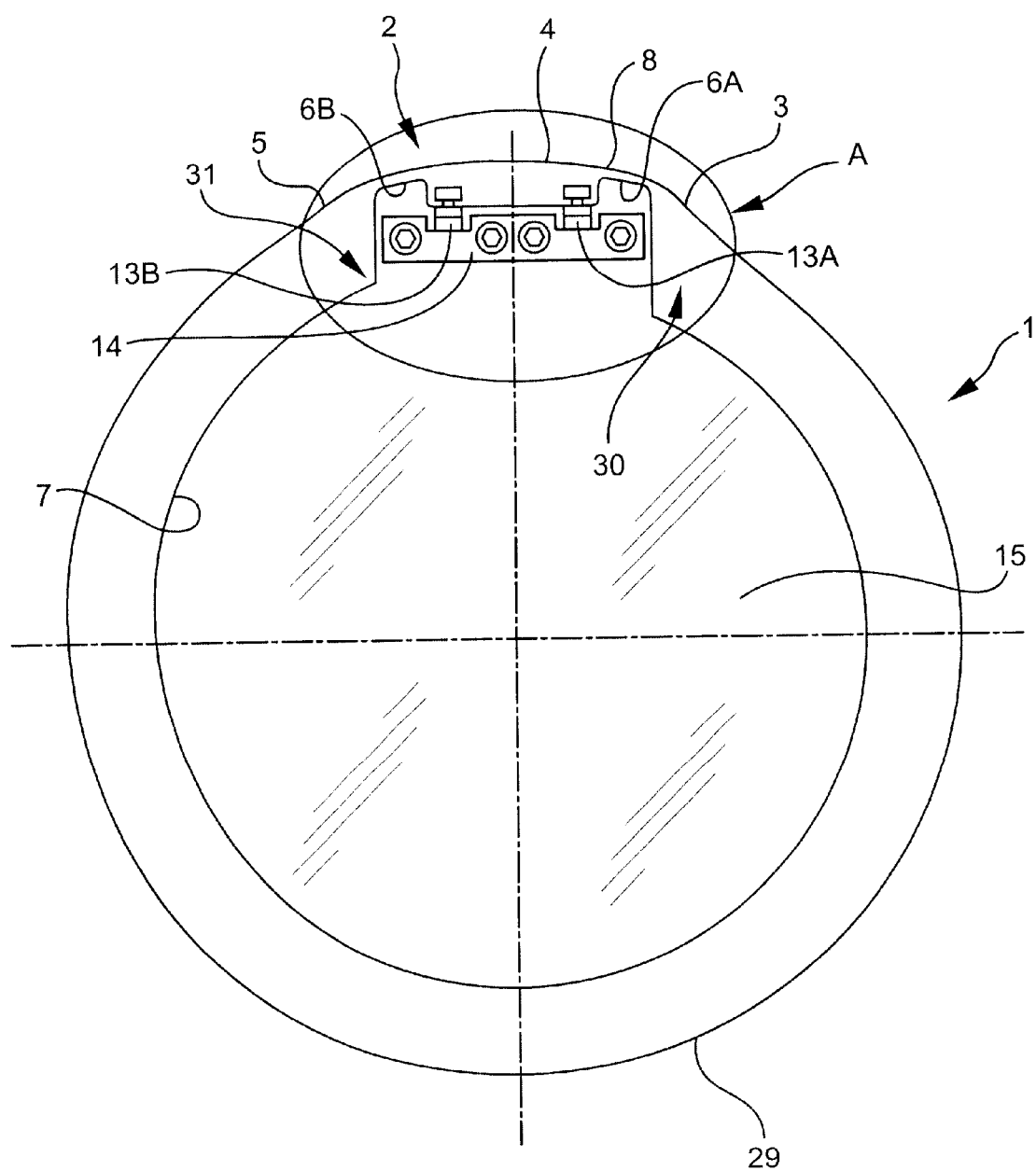
FIG. 1 is a top view of a driving cam in accordance with the invention.
Figure 2:
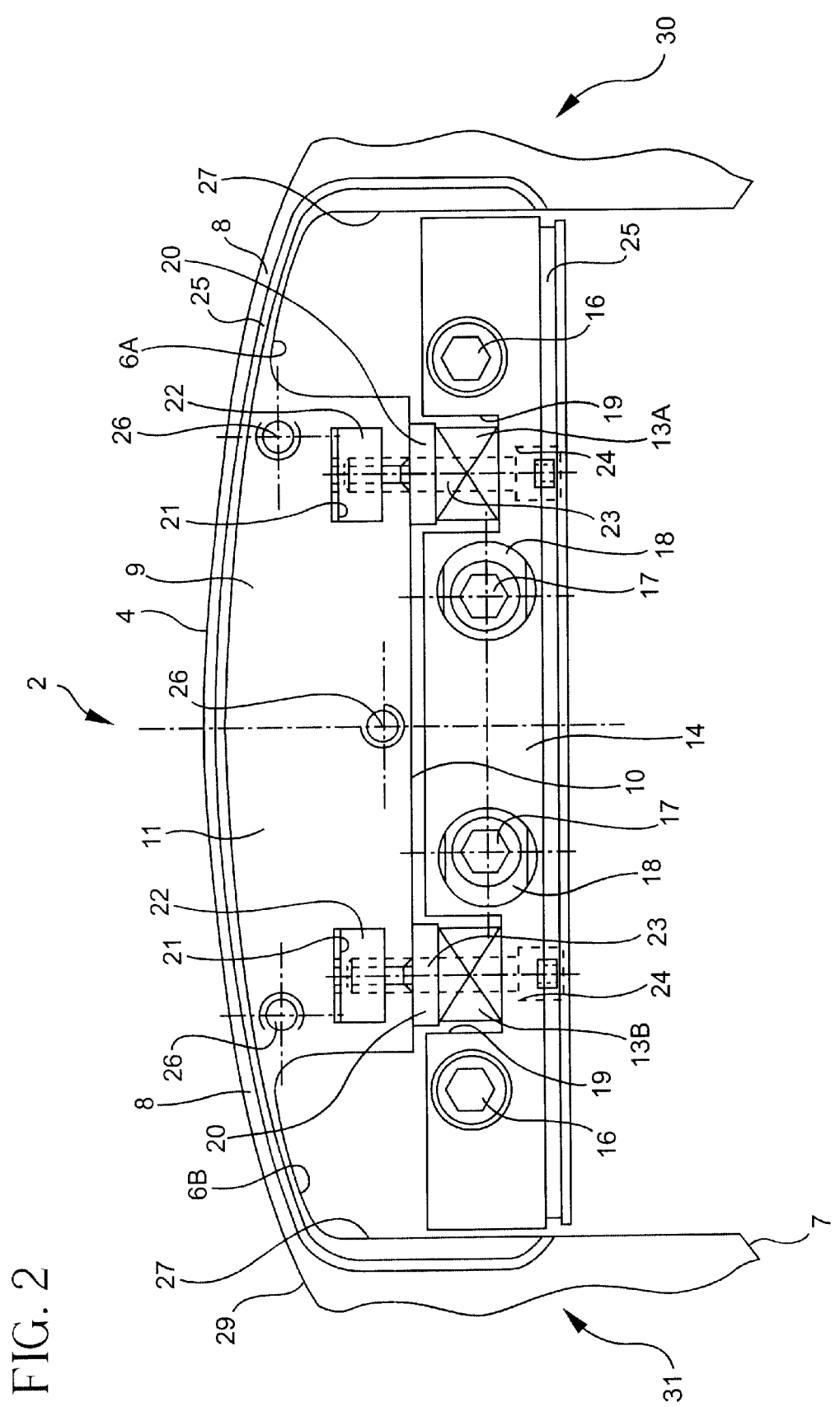
FIG. 2 is an enlarged view of detail A from FIG. 1.

The drive assembly consists of two superimposed cams, one for the first and one for the second operation, only the cam of the second operation being detailed in the figures. As is known in itself, during the second operation (the only one of interest to the invention), a wheel mounted on the end of an arm connected to a pivoting shaft definitively seams the seaming lip at the end of the can; a rotating follower on the end of another arm connected to the shaft rolls against the cam 1, so causing the shaft to pivot and thus providing the application force for the seaming wheel. For this purpose the cam 1 comprises an active region or sector 2 having a first end 30 and a second end 31 in which is formed, on a cylindrical periphery of the cam 1, a external profile 29 made up of, for example, an ascending ramp 3 followed by a plateau 4 and a descending ramp 5. The cam 1 is in the form of a thick ring with two flat annular faces. First and second deep recesses 6A, 6B have been machined, e.g. by electrical discharge machining, in the active section 2 from the inner profile 7 of the cam, defining between them a sensor portion on which the force applied by the cam to the follower is measured. The two recesses 6A, 6B form relatively thin bridges of material 8, between which lies a thicker measuring part 9 with a flat inner face or plateau zone 10 and a flat upper face 11. Below the measuring part 9 are the sensors 13A, 13B in the form of load discs. The sensors 13A, 13B are secured and adjusted by means of a bar 14 placed underneath the active region 2 and screwed into the cam base 15 adjacent to the first and second cam profiles, using two end screws 16 to secure the bar with a certain amount of play and two central screws 17 acting on eccentrics 18 in order to precisely adjust the position of the bar with respect to the measuring part 9. The bar 14 has two housings 19 containing, besides the sensor 13A or 13B, a bearing washer 20 with a perfectly flat surface placed against the inner face 10. Two cavities 21 are formed in the part 9, e.g. by electrical discharge machining, and house a nut 22 whose threaded hole takes the threaded end of a screw 23 holding the corresponding sensor 13 in position. The screws 23 run through the bar 14, the sensors 13A, 13B and the washers 20 and are retained by their heads in housings 24 in the bar 14. A peripheral groove 25 is formed in the bar 14 and on the surface 11 to take a seal and holes 26 in the part 9 allow for a lid (not shown) to be screwed down over the measuring part 9 and bar 14. The lids and the associated leaktightness ensure that moisture and impurities cannot come into contact with the sensors or connections. The dimensions of the bar 14 are adapted to fit between those parallel outer walls 27 of the cavities 6, at right angles to the face 10, which extend from the bridges of material 8 to the inner periphery 7 of the cam.

Figure 3:
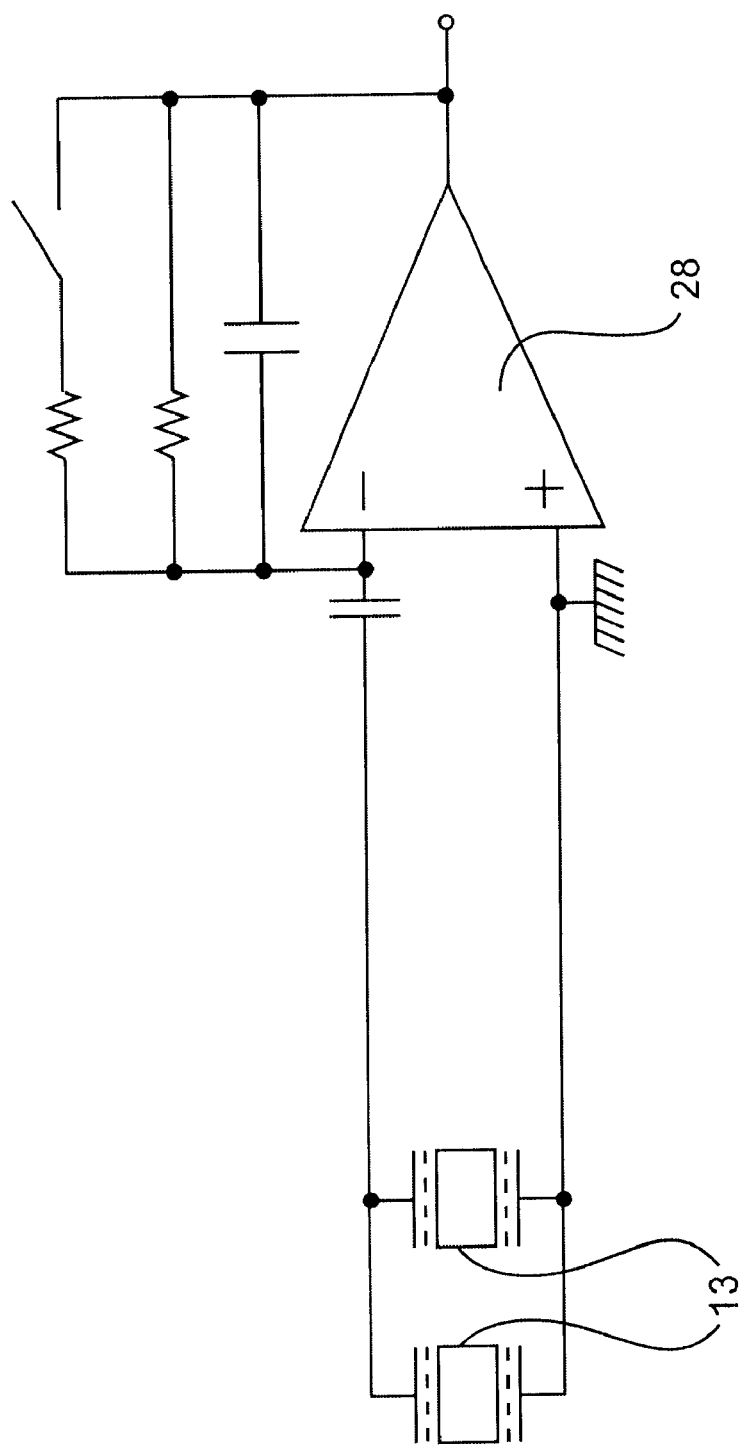
FIG. 3 is a sensor mounting diagram.

As FIG. 3 shows, the electrical conditioning of the signals provided by the two sensors 13 is limited to the use of a single charge amplifier 28 that has a short integration time constant. The advantage of this is that it eliminates all the static drift of the measurement system (particularly temperature drift).

What is claimed is:

1. A driving cam for seaming a container configured to cooperate with a rotating drive follower to generate signals to be processed by an analytical device, the driving cam comprising:

a cam base;

an annulus defined by an internal profile and an external profile and being formed with an active sector, said active sector having a first end and a second end and being defined by said internal profile and said external profile where:

said external profile is formed with an ascending ramp at said first end and a descending ramp at said second end with a plateau located between said ascending ramp and said descending ramp; and said internal profile is formed with a first recess at said first end and a second recess at said second end with a flat inner face located between said first recess and said second recess;

a bar connected to said cam base and located within said annulus below said active sector;

a first load cell connected between said bar and said flat inner face adjacent to said first recess; and a second load cell connected between said bar and said flat inner face adjacent to said second recess, wherein said first and second load cells are configured to generate electrical output signals for processing by the analytical device that represent a force exerted by said annulus on the drive follower.

2. A driving cam according to claim 1, wherein said first and second load cells are quartz discs.

3. A driving cam according to claim 1, wherein said bar induces a prestress on said first and second load cells.

4. A driving cam according to claim 1, wherein said bar is fixed to said cam base.

5. A driving cam according to claim 4, wherein said bar is partially fixed to said cam base.

* * * * *